Patented July 8, 1941

2,248,830

UNITED STATES PATENT OFFICE 2,248,830

ALKYLATED PHENOL

Gordon H. Stillson, Oakmont, and David W. Sawyer, Pittsburgh, Pa., assignors to Gulf Research & Development Company, Pittsburgh, Pa., a corporation of Delaware No Drawing. Application April 26, 1939, Serial No. 270,232

1 Claim. (Cl. 260—624)

This invention relates to alkylated phenols; and it comprises as a new compound 2-tertiary-butyl-4-methyl-6-tertiary-amyl phenol which is soluble in oil and insoluble in water and in dilute aqueous alkali solutions, and possesses the property of inhibiting oxidational changes in organic materials such as petroleum and hydrocarbon products and the like; and it includes stabilized organic materials, particularly petroleum products, containing this compound in relatively small amounts; all as more fully hereinafter set forth and as claimed.

We have discovered that we can produce the compound 2-tertiary-butyl-4-methyl-6-tertiary-amyl phenol by treating ortho-tertiary-amyl-para-cresol with isobutylene or mixtures containing isobutylene in the presence of an acid catalyst such as sulfuric acid, and that the compound thus produced is soluble in oil and insoluble in water and in dilute aqueous alkali solution. We have also discovered that this new compound 2-tertiary-butyl-4-methyl-6-tertiary-amyl phenol possesses good antioxidant properties, and when added to organic materials, especially petroleum products such as motor fuels, lubricating oils and greases, insulating oils, turbine oils, solvents, waxes and the like in relatively small amounts, it stabilizes such materials against oxidational changes.

In preparing 2-tertiary-butyl-4-methyl-6-tertiary-amyl phenol from ortho-tertiary-amyl-para-cresol and isobutylene using a sulfuric acid catalyst, commercial concentrated sulfuric acid may be used with or without the addition of a mitigating agent, such as boric acid or an alkali sulfate, adapted to lessen the polymerizing effect of the sulfuric acid on the isobutylene. When commercial concentrated sulfuric acid is used, amounts corresponding to about 5.0 per cent of the weight of the ortho-tertiary-amyl-para-cresol have produced satisfactory yields. When a mitigating agent is used, for example boric acid, a solution of 5.0 per cent by weight of boric acid in commercial concentrated sulfuric acid may be used in amounts corresponding to about 5.0 per cent of the weight of the ortho-tertiary-amyl-para-cresol.

The catalyst is customarily first mixed with the ortho-tertiary-amyl-para-cresol and the isobutylene is passed into the mixture. Isobutylene is added to the mixture until an amount has been absorbed corresponding to one to two moles of isobutylene per mole of ortho-teritary-amyl-para-cresol. In general amounts corresponding to about 1.5 to 1.8 moles of isobutylene per mole of ortho-tertiary-amyl-para-cresol have proved most advantageous.

We have found when the reaction is carried out at temperatures below about 20° C., a better yield of 2-tertiary-butyl-4-methyl-6-tertiary-amyl phenol is obtained than when the reaction is carried out at higher temperatures. While, therefore, the reaction may be carried out at temperatures of 25° to 30° C. and substantial yields obtained, we have found it more advantageous to maintain the reaction temperature within the range of 10° to 20° C. Using temperatures within this range yields on the order of 65.0 to 70.0 per cent of the theoretical may be obtained.

After the proper amount of isobutylene has been absorbed in the mixture of ortho-tertiary-amyl-para-cresol and acid catalyst, and the reaction is complete, the reaction mixture is washed with dilute aqueous alkali solution to remove the acid catalyst and any alkali soluble material remaining. In carrying out the washing operation it is often desirable to first dilute the reaction mixture with an organic solvent, for example, with one-half to one volume of benzene. The dilute aqueous alkali solution used for washing is customarily a 10 per cent solution of sodium hydroxid or other alkali solution of equivalent alkalinity. Somewhat stronger solutions may be used if desired, and satisfactory results can be obtained with aqueous alkali solutions having alkalinities equivalent to those of sodium hydroxid solutions containing up to 20 per cent sodium hydroxid. After the alkali wash, the benzene solution of the reaction mixture is washed with water until the washings are substantially neutral to litmus, and it is then dried, for example with anhydrous sodium sulfate.

The benzene may be removed from the washed neutralized product thus obtained, by distillation under reduced pressure (20–40 mm.) and the residue distilled at 2 mm. pressure. The fraction which boils at 87°–90° C. is a colorless oily liquid having an ultimate analysis which corresponds quite closely to the theoretical calculated composition of 2-tertiary-butyl-4-methyl-6-tertiary-amyl-phenol. For example, the ultimate analysis of a 2-tertiary-butyl-4-methyl-6-tertiary-amyl-phenol product obtained in this manner compared with the theoretical composition as follows:

| Ultimate analysis | Found for product | Calculated for 2-t-butyl-4-methyl-6-t-amyl phenol |
|---|---|---|
| | Percent | Percent |
| Carbon | 81.80 | 81.98 |
| Hydrogen | 11.08 | 11.19 |
| Oxygen | Balance | 6.83 |

The substantially pure 2-tertiary-butyl-4-methyl-6-tertiary-amyl-phenol product thus obtained is insoluble in water and in dilute aqueous alkali solution, and is soluble in various organic solvents, such as 95 per cent alcohol, ligroin, benzene, ether, gasoline and petroleum products.

The properties of oil solubility and insolubility in dilute aqueous alkali solution, combined with its property of inhibiting oxidational changes, make the 2-tertiary-butyl-4-methyl-6-tertiary-amyl phenol of our invention a particularly useful antioxidant in the stabilization of petroleum and hydrocarbon products such as motor fuels, lubricating oils and greases, insulating oils, turbine oils and the like. For example, its insolubility in water makes it particularly advantageous for the stabilizing of gasoline and oils intended for use in contact with water. Also its insolubility in dilute aqueous alkali solution permits its addition to cracked gasoline at an early stage in the process of production, prior to the usual alkali washing step, thereby increasing its effectiveness as an antioxidant.

The following specific examples illustrate the effectiveness of 2-tertiary-butyl-4-methyl-6-tertiary-amyl phenol in preventing oxidational changes in petroleum products.

When 2 - tertiary - butyl-4-methyl-6-tertiary-amyl phenol prepared as above described was added to cracked gasoline in the proportion of 0.0002 mol per 100 cubic centimeters (0.0468 gram per 100 cc.) the oxygen stability induction period of the gasoline, as determined by the method of Hunn, Fischer and Blackwood, J. Soc. Automotive Eng. 2, 31 (1930), was increase from one hour to 25½ hours.

When about 0.3 per cent by weight of 2-tertiary-butyl- 4 -methyl- 6 -tertiary - amyl phenol prepared according to our invention was added to a transformer oil having a sludge induction period of zero, in an accelerated transformer oil sludge test, an oil having a sludge induction period of four days was produced. Since the formation of sludge is recognized to be the result of oxidational changes in the oil and a definite measure of the deterioration of the oil, it will be seen from this test that the addition of very small amounts of 2-tertiary-butyl-4-methyl-6-tertiary-amyl phenol is effective to inhibit the oxidational changes normally taking place and materially increase the useful life of transformer oils.

While this invention has been described with reference to specific details and examples of the production and properties of the compound of our invention, it is to be understood that the invention is not intended to be limited to such details and examples, except as recited hereinafter in the appended claim.

We claim:

2 - tertiary - butyl - 4 -methyl-6-tertiary-amylphenol.

GORDON H. STILLSON.
DAVID W. SAWYER.